UNITED STATES PATENT OFFICE.

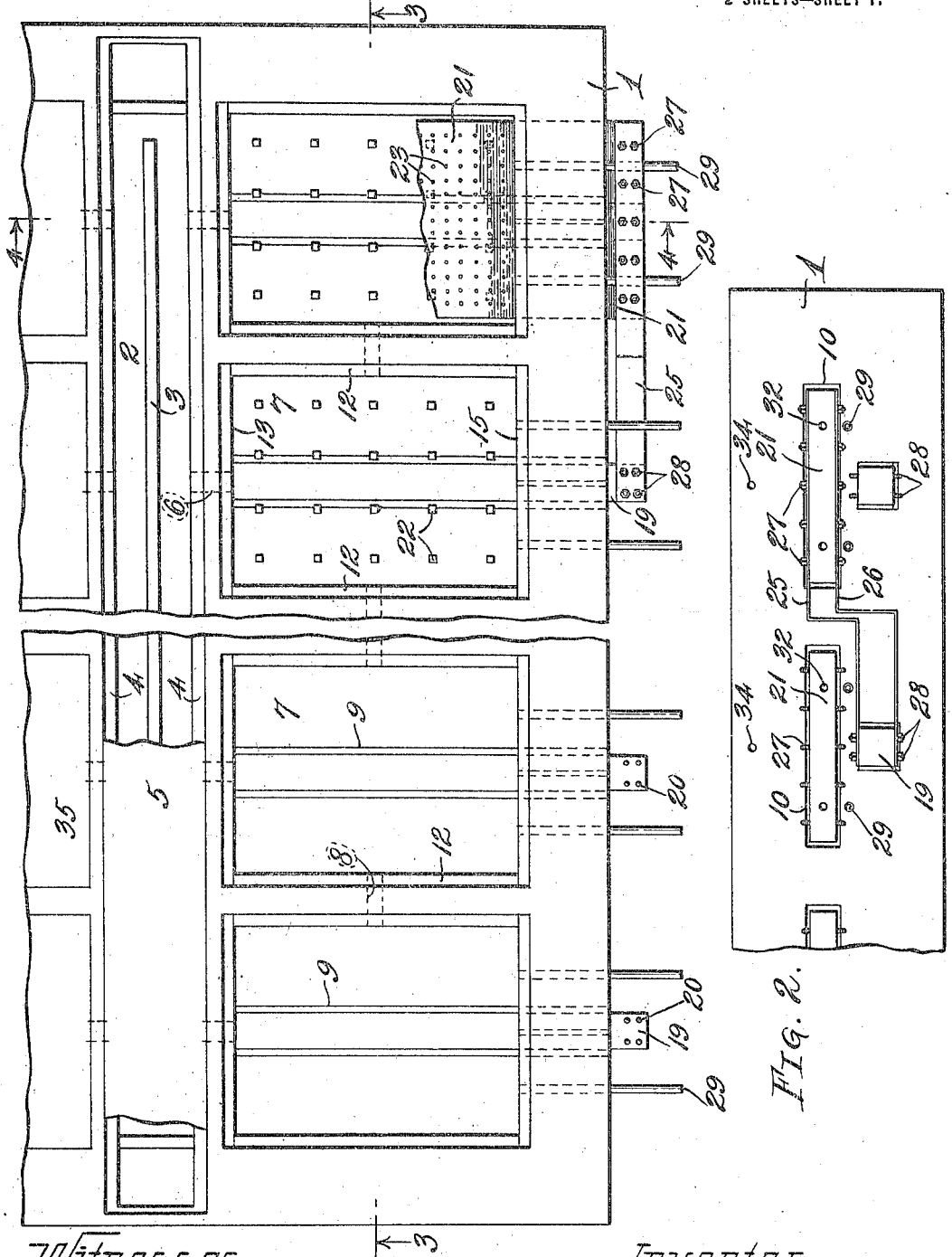

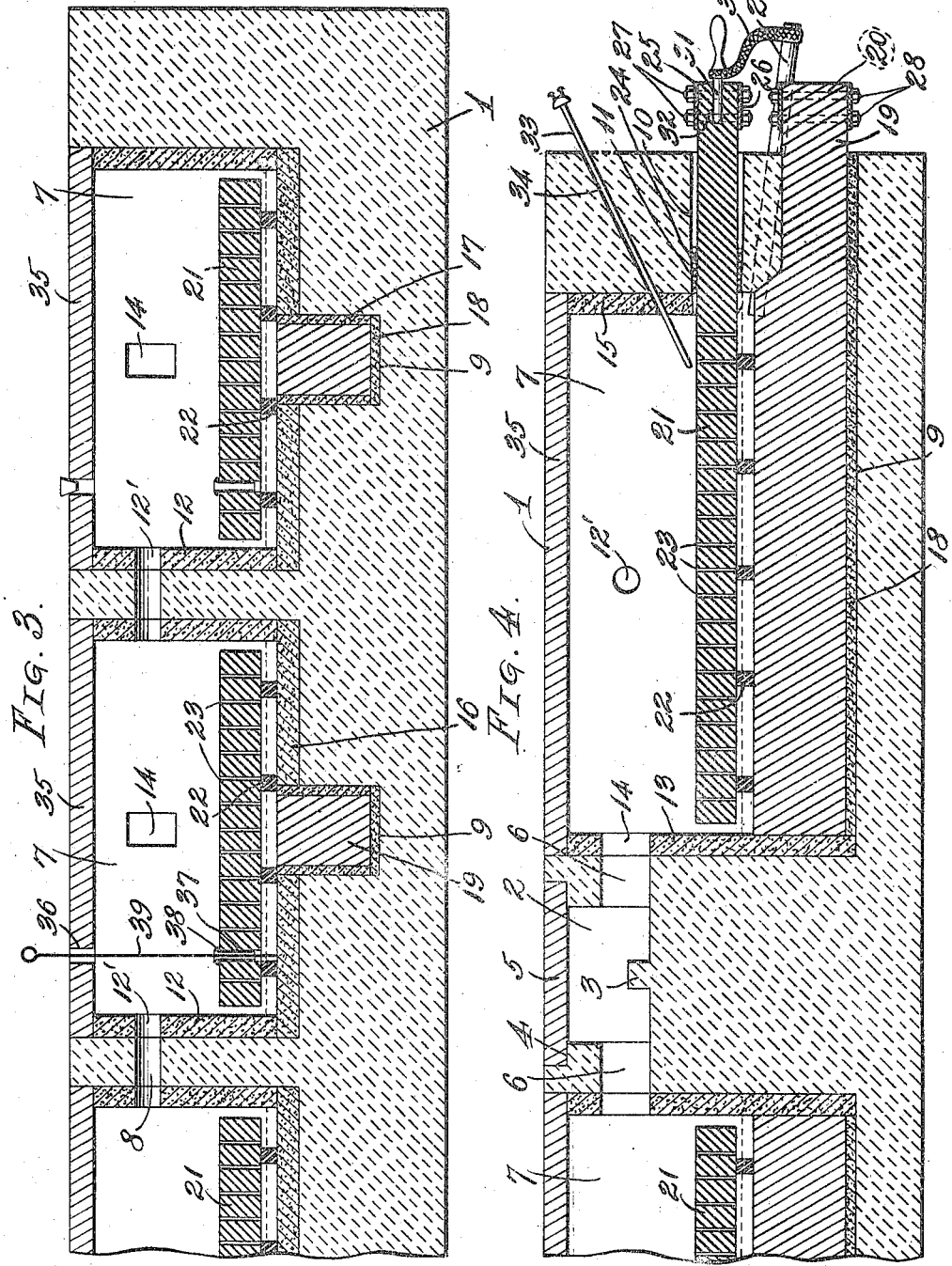

JOHN L. MALM, OF DENVER, COLORADO, ASSIGNOR TO THE MIDWEST METALS COMPANY, OF DENVER, COLORADO, A CORPORATION OF COLORADO.

CELL.

1,255,197.

Specification of Letters Patent.   Patented Feb. 5, 1918.

Application filed April 26, 1915.   Serial No. 24,016.

*To all whom it may concern:*

Be it known that I, JOHN L. MALM, a citizen of the United States, residing at Denver, in the county of Denver and State of Colorado, have invented certain new and useful Improvements in Cells, of which the following is a specification.

This invention relates generally to metallurgical apparatus and particularly to electrolytic cells utilized in treating metallic salts to drive off the gaseous anion and deposit the metal and constitutes an improvement of the apparatus set forth in my copending application, Serial No. 853,859, filed July 29, 1914.

The invention may be further briefly summarized as consisting in the construction and combination of parts hereinafter set forth in the following description, drawings and claims.

Referring to the drawings, Figure 1 is a top plan view of a portion of the apparatus; Fig. 2 is a front elevation of a portion of the apparatus; Fig. 3 is a section upon the line 3—3 of Fig. 1; and Fig. 4 is a section upon the line 4—4.

In carrying out the invention the battery of cells may be arranged in any preferred manner to meet the requirements but I have shown one arrangement which is effective, and in such embodiment 1 represents the main casing built of concrete or similar material and having a central longitudinally disposed trough 2 serving as a supply for the material to be treated, such material in this case being molten zinc chlorid. This trough 2 is provided with a central rib 3, for preventing short circuiting of opposite cells through the electrolyte. This trough is provided with a ledge 4 for receiving a cover 5 of suitable material to withstand the heat and to hold the gas which may be collected from the ends of the trough in any suitable manner, the gas being chlorin in this instance. This trough 2 communicates by lateral passages 6 with the several cell chambers 7 which are arranged in groups or batteries on each side of the trough and which extend downward within the casing to a suitable depth. The several cell chambers communicate with each other by openings 8 in the side walls, these openings however being arranged above the bottom of the trough 2. In the bottom of each of the chambers 7 is a depression or well in the form of a trough or channel 9 extending downward and opening out at the sides of the cell opposed to the trough 2, as shown in Fig. 4. This well 9 is narrower than the width of the cell, and above it and extending for nearly the entire width of the cell and in the side wall is an anode opening 10 preferably rectangular in shape and extending upward and spaced for a short distance above the bottom of the cell. This opening tapers inward, as indicated at 11, for a purpose to be described. The inner side walls of each cell chamber are provided with lining plates 12, while the inner end of the cell is provided with lining plates 13 having openings 14 communicating with the openings 6 leading to the trough 2. The side lining plates 12 are provided with openings 12′ registering with the openings 8 between the cell chambers. Above the anode opening 10 is a similar lining 15, and upon the bottom of chamber 7 on each side of the well 9 are suitable bottom plates 16. The well 9 is lined on its sides with side plates 17, and these engage upon the top of the bottom plate 18, these plates extending out to the outside of the casing. Extending in through the opening 9 into the well is a cathode bar 19 which is zinc in this instance, and it may be formed in any suitable manner, as by pouring metal into a suitable temporary form set against the outside of the cell and causing the metal to run into the previously heated cell chamber in sufficient quantity to fill the well and cover the bottom of the cell chamber to a depth of from ¼ to ¾ inch. The outer end of each of these cathodes is provided with one or more vertically disposed openings 20, shown in dotted lines in Fig. 4, for a purpose to be described. Extending through the anode opening 10 is an anode 21 preferably of graphite and supported upon the bottom of the cell by suitable insulating blocks 22. This anode is provided with perforations 23 for permitting the passage of gas and fused chlorid through the same. This anode is supported in the anode opening 10 by suitable packing 24 of asbestos rope or any suitable material. The anode projects out beyond the outer face of the casing and is connected by upper and lower bus bars 25 and 26 respectively to the cathode of the next adjoining cell, as clearly shown in Fig. 2, these bus bars being held to the anode by suitable bolts 27 and to the cathode by suitable bolts 28.

In order to tap off the metal after the cell has operated for a sufficient length of time to form a deposit of metal to the proper level, suitable means is provided and it comprises tap tubes 29, each extending diagonally upward through the casing into one of the cells to a point therein such that it will drain if desired nearly to the main bottom of the cell chamber leaving a deposit of metal in the cell chambers to form the cathode. This tube is of graphite and is open straight through so that ordinarily the molten material could pass freely through it, but when the apparatus is started, a plug is inserted in the outer end of the tube, with the result that the molten material within freezes or becomes hardened sufficiently to prevent any flow through it for the present. In order to establish a flow through it at the time of tapping or when the metal has risen to the proper level, the outer end of the tube is provided with an electrical connection 30 secured to a plug 31, which is adapted to be inserted in a suitable opening 32 in the anode of the particular cell in which that particular tube is located, with the result that the current is short circuited through the tube, causing it to heat sufficiently to melt the material which is hardened in the tube, thus allowing the metal to flow freely out through it. The heat within each cell is read by a suitable pyrometer 33 extending through a suitable opening 34 into the cell. The side linings 13 and the end linings 14 and 15 stop at a short distance from the top of the casing and serve to receive a cover 35 of vitribestos board, or any other suitable material.

In operation molten material, such as zinc chlorid, is supplied to the trough 2 where it flows on each side of the rib 3 through the passage 6 into the cell chambers, which have been previously heated and establishes an electrical connection between the metal on bottom of the cell chamber and the anode. The material accumulates in the cells until it rises to the height of the trough 2 during which operation it is being subjected to the action of the current, and the chlorin has been liberated, depositing the metal, zinc in this instance, in the bottoms of the cells. It has been found necessary to maintain the level of the metal deposit, zinc in this instance, within such limits that it does not drop below a point where the resistance of the electrolyte is too great on the one hand and does not rise to a point such that short circuiting or arcing occurs between the molten metal and the anode. In operating the device, as set forth in the drawings and arranged substantially in the manner shown, level of the molten zinc at a point from one-quarter to three-quarters of an inch above the bottom of the cell and to permit it to accumulate until the level rises to a point about one-quarter of an inch from the anode, it being obvious that during operation, a certain level of the molten zinc could be maintained so that the cell could operate at its greatest efficiency at all times. During operation of the cell the metal is deposited in the bottom and chlorin gas rises to the top of each cell and passes out into the top of the trough from whence it may be collected in any suitable manner.

In order to determine the height of the metal and electrolyte in the cell from time to time during operation, I provide an opening 36 in the cover, and in a line with this an opening 37 in the anode, the latter opening receiving an insulator tube 38. Through these two openings a rod 39, preferably of iron, is projected until it rests upon the bottom of the cell. The metal adheres to the rod, and when withdrawn, will indicate the height of the metal in the bottom of the cell. The metal and the electrolyte both adhere to the rod, the former being indicated by the deposit of metal on the rod, and the latter being indicated by the "wetting" of the rod above the deposit of metal.

Having described my invention, I claim:—

1. Apparatus for treating metallic salts, comprising a hollow casing having a cell chamber therein, the bottom of said chamber being provided with a trough-like well opening out through the cell wall, a metallic electrode filling said well and having its upper surface exposed to the metal deposited in the cell and also having one integral end portion extending out through the opening in the cell wall, and a second electrode lying above the first named electrode and also extending out beyond the wall of the cell.

2. Apparatus for treating metallic salts, comprising a hollow casing having a cell chamber therein, the bottom of said chamber being provided with a trough-like well opening out through the cell wall, a metallic electrode filling said well and having its upper surface exposed to the metal deposited in the cell and also having one integral end portion extending out through the opening in the cell wall, the cell wall above said opening being provided with a second opening whose surfaces taper inwardly toward the cell, a second electrode in said tapered opening, and packing material in said tapered opening surrounding said second electrode.

3. Apparatus for treating metallic salts, comprising a hollow casing having a cell chamber therein, the bottom of said chamber being provided with a trough-like well opening out through the cell wall, a metallic electrode filling said well and having its upper the cell and also having one integral end portion extending out through the opening in the cell wall, a second electrode lying above the first named electrode and also extending out beyond the wall of the cell, and electrical connections to said two electrodes located wholly outside of the cell casing.

4. Apparatus for treating metallic salts, comprising a casing having a cell chamber therein whose bottom is provided with a trough-like well, an electrode in said well having an integral portion extending out beyond the side wall of the cell, a second electrode lying above the first named electrode and also extending beyond the cell wall, and means for at any time determining the height of the electrolyte and the deposit of metal in the cell.

5. In apparatus for treating metallic salts, a casing having a cell chamber therein, a cathode in the bottom of the cell chamber, an anode within the cell and spaced from the cathode, and means for determining the height of the electrolyte and the deposit of metal in the cell at any stage in the operation.

6. In apparatus for treating metallic salts, a casing having a cell chamber therein, a cathode in the bottom of said cell, an anode within the cell and spaced from the bottom, said anode having an insulated opening therethrough, and means projecting through the insulation of said opening and touching the bottom of the cell whereby the metal and electrolyte may accumulate upon said means and thereby indicate the height of such metal and electrolyte.

7. In apparatus for treating metallic salts, a casing having a cell chamber therein, a cathode arranged in the bottom of the cell, an anode within the cell having an opening therethrough, an insulating tube in said opening, a cover for said cell, an opening through said cover in alinement with the opening in the insulating tube, and a bar passing through said openings and touching the bottom of the cell.

In testimony whereof I affix my signature in presence of two witnesses as follows.

JOHN L. MALM.

Witnesses:
S. C. IONIDES,
J. W. T. GRAY.